Sept. 2, 1930.                H. B. ELY                  1,774,826
                    MOUNT FOR SOUND APPARATUS
                      Filed Feb. 1, 1929          4 Sheets-Sheet  1
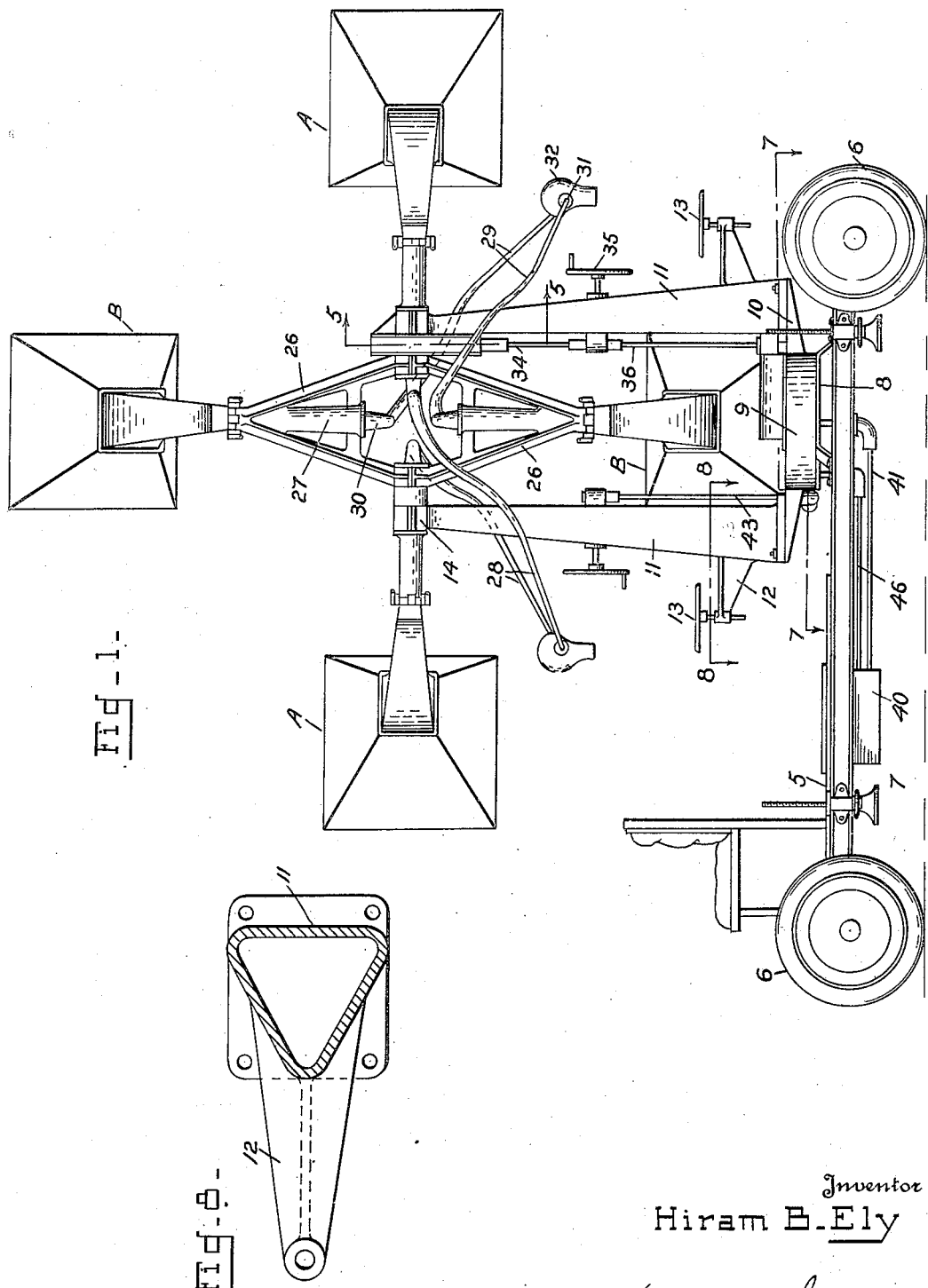
Inventor
Hiram B. Ely
By  W. N. Roach
                Attorney

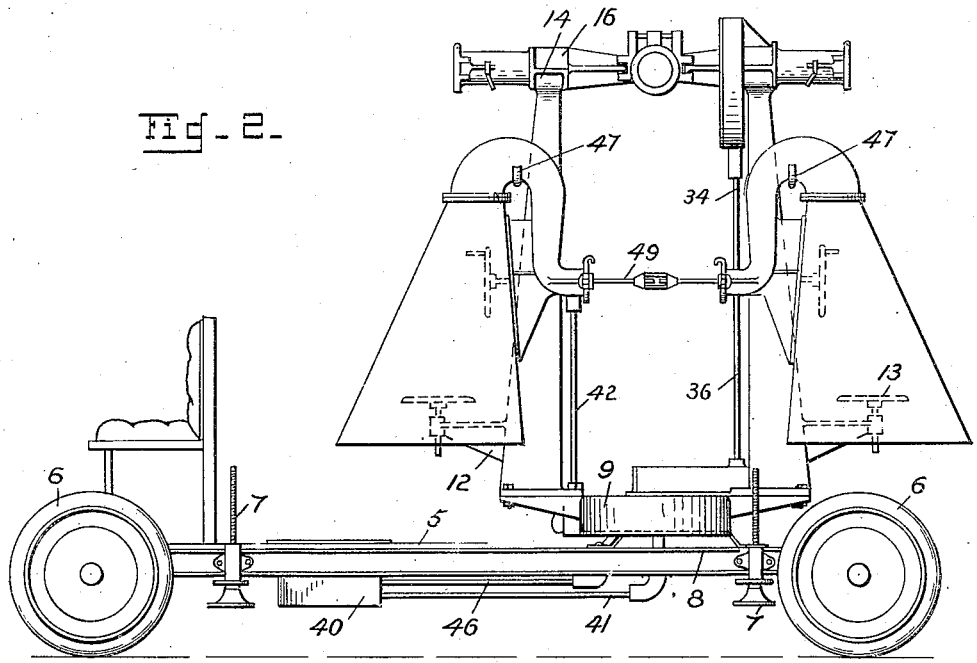
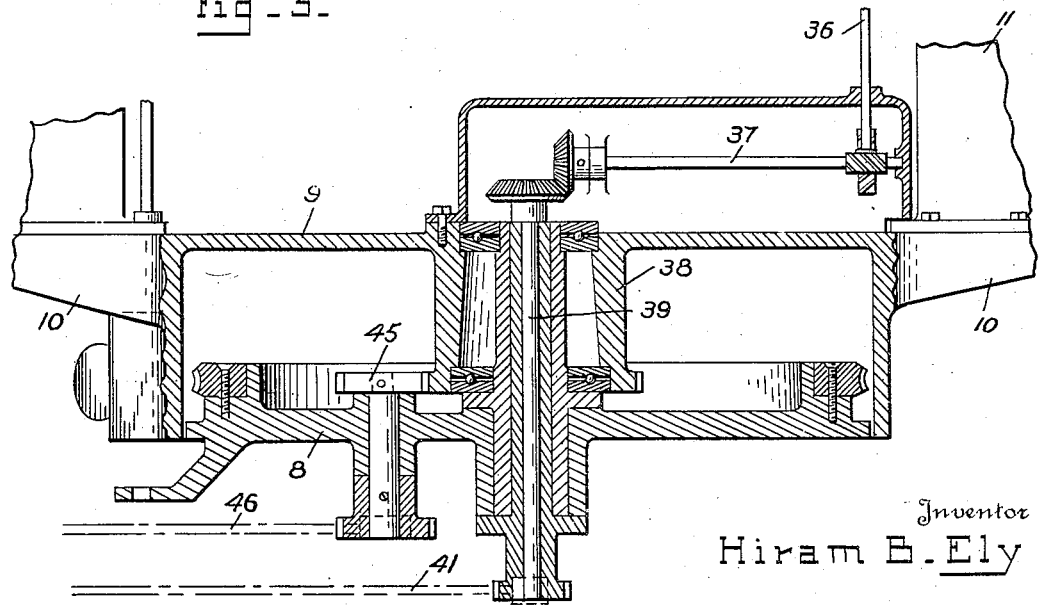

Sept. 2, 1930.  H. B. ELY  1,774,826
MOUNT FOR SOUND APPARATUS
Filed Feb. 1, 1929   4 Sheets-Sheet 3
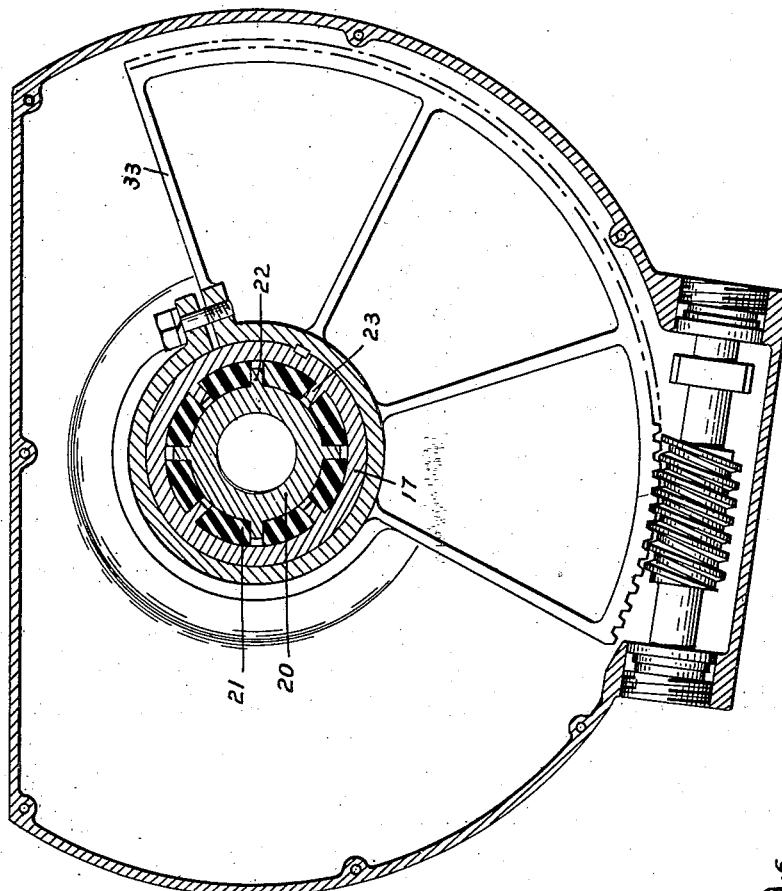
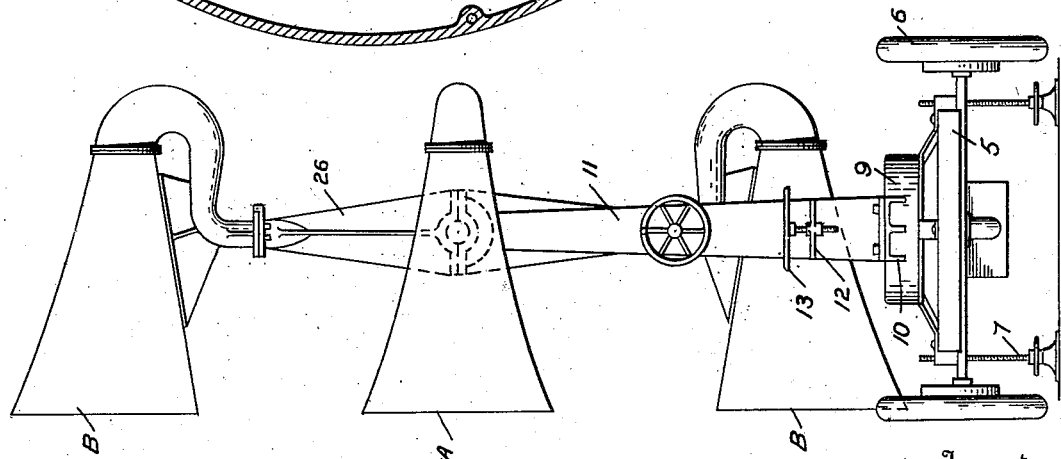
Inventor
Hiram B. Ely
By W. N. Roach
Attorney Sept. 2, 1930.    H. B. ELY    1,774,826
MOUNT FOR SOUND APPARATUS
Filed Feb. 1, 1929    4 Sheets-Sheet 4
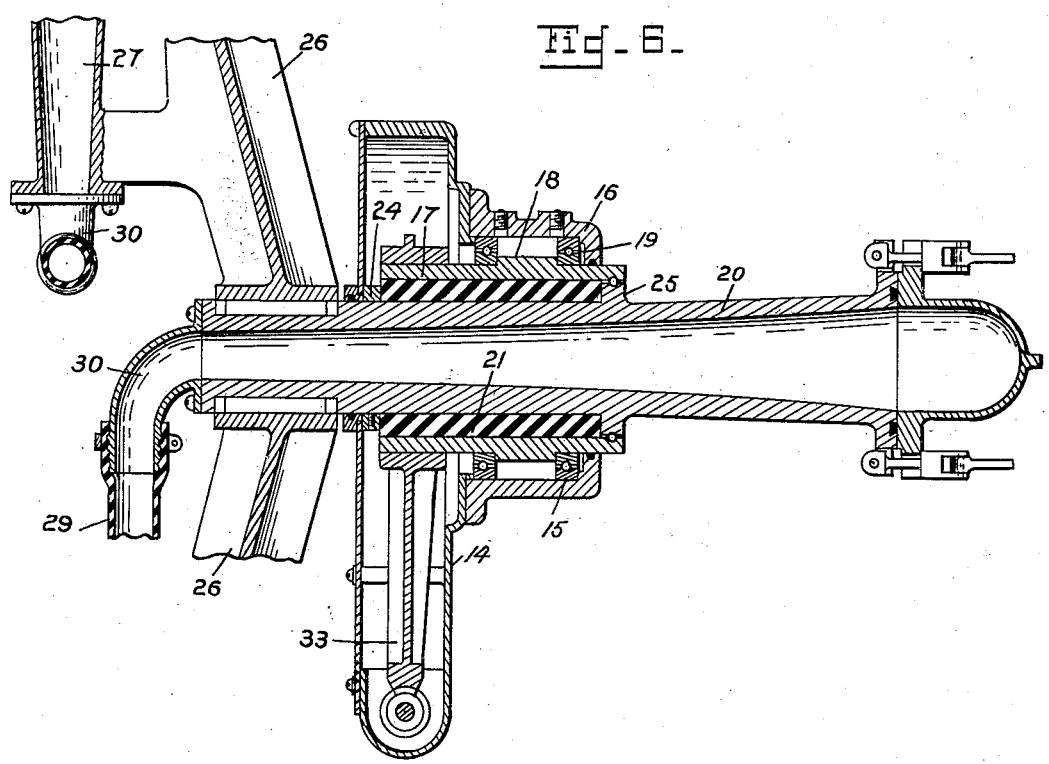
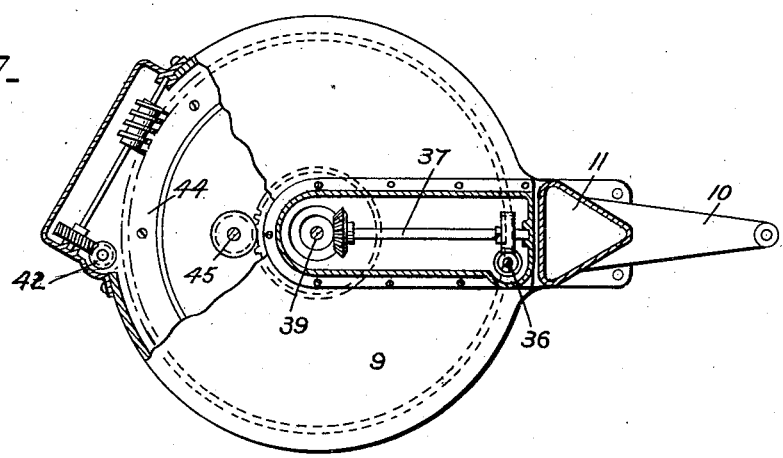
Inventor
Hiram B. Ely
By W. N. Roach
Attorney Patented Sept. 2, 1930

1,774,826

UNITED STATES PATENT OFFICE

HIRAM B. ELY, OF NEW YORK, N. Y.

MOUNT FOR SOUND APPARATUS

Application filed February 1, 1929. Serial No. 336,774.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a mount for sound apparatus.

Sound locating apparatus of the "trumpet" type, disclosed in Patent No. 1,686,904, operates according to a system of binaural comparison in which the apparatus is directed at the source of sound and the listener reduces the phase difference to zero. In sound ranging on aerial targets such as airplanes, a vertically disposed set of parallel horns must be combined with a horizontally disposed set and the horns of each set must be separated a considerable distance to increase the time difference in sound transmission and sharpen the binaural sense of the listeners. These conditions necessitate a structure of considerable size and the arrangement of the elements, as shown in the patent above referred to, has not been convenient for service in the field.

The improvements contemplated by the present invention are directed to the mount and are distinguished principally by the formation of a cross arm support from the small ends of the four horns. By this arrangement the rigid horns terminate approximately at the intersection of the axes of rotation of the apparatus and prevent entanglement of the flexible end portions of the horns.

Provision is made in the trunnion bearing for damping out any sound vibrations which arise from gears and other mechanical and electrical parts.

A further advantage of decided merit which arises from the construction is the possibility of transmitting the azimuth and elevation data to a corrector which is placed on a non-rotatable part of the mount.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in rear elevation of the improved sound apparatus mounted on a trailer;

Fig. 2 is a similar view with the horns dismounted and in the travelling position;

Fig. 3 is a detail longitudinal sectional view through the top carriage;

Fig. 4 is a view in side elevation of the sound apparatus;

Fig. 5 is a sectional view on the line 5—5 of Fig. 1;

Fig. 6 is a detail sectional view through one of the trunnions;

Fig. 7 is a detail sectional view on the line 7—7 of Fig. 1; and

Fig. 8 is a detail sectional view on the line 8—8 of Fig. 1.

Referring to the drawings by characters of reference:

The mount consists of a platform 5 provided with wheels 6 and leveling jacks 7 and having a base 8 on which is rotatably mounted a top carriage 9. The top carriage is formed with oppositely extending arms 10 on which are secured spaced upright standards 11, hollow and triangular in cross section and each having a bracket 12 for a seat 13.

In order that the operator occupying the seat may conveniently place his feet on the carriage 9, the standard is arranged to present inclined sides to the knees of the operator who sits astride the standard.

The upper extremities of the standards terminate in bearings 14, (see Fig. 6) each arranged to receive a pair of ball bearing assemblies 15, the upper portions of which are confined by a trunnion cap 16. Mounted in the ball bearing assemblies is a sleeve 17 having a boss 18 spacing the inner races 19—19 of the assemblies 15. Passing inwardly through the sleeves 17 on each standard is the support section 20 of a pair of horns A—A, the inner extremities of the support sections being slightly spaced and terminating approximately midway between the trunnion bearings 14. The support sections 20 are directly supported by a bushing 21 made of a material which is a poor conductor or a non-conductor of sound, in the present case, rubber, which is inserted between the support section and the sleeve 17. This provision is made for the purpose of damping out any sound vibrations which arise from metallic actuating parts or electrical apparatus on the standard.

In order that the support sections may be rotated through mechanism acting on the sleeve 17, the bushing 21 is made in sections (see Fig. 5) which are placed between alternately disposed, longitudinally extending fins 22 and 23, formed respectively on the outer wall of the support section and on the inner wall of the sleeve. The bushing is laterally confined between a ring 24 secured on the support section and an annular flange 25 formed thereon.

The horizontal support sections 20 of the horns A—A are joined by the support sections 26—26 of parallel horns B—B, the assembly of the horn support sections forming a rigid cross-arm support with an open center. The sections 26 are in the form of yokes, keyed and clamped to the inner portions of the horizontal sections and each of them includes a central sound tube 27, preferably formed integral with the yoke and terminating adjacent the ends of the horizontal sections. The four terminals are substantially at the intersection of the axes of rotation in azimuth and elevation, and, consequently, will avoid entanglements of the pairs of flexible sound conducting tubes 28 and 29, connected to the support sections by elbows 30. The former set of tubes lead from the horns A—A and the latter from the horns B—B. The tubes of each set are placed one on each side of one of the standards and are connected to acoustic receivers 31, secured in a helmet 32.

The horns are moved in elevation through a worm segment 33 keyed and clamped on the inside portion of the sleeve 17 on the right hand standard and actuated through shafting 34 from a central shaft 35 positioned intermediate the height of the standard. The elevation data is also transmitted downwardly from the central shaft through shafting 36, then across a radius of the carriage 9 through shafting 37, (see Fig. 3) and through the bearing stud 38 of the carriage by means of shafting 39 and, finally, to a corrector 40 on the platform 5 through shafting 41. The element of azimuth, which has thereby been added in the elevation data is removed through differential gearing (not shown) contained in the corrector. The details of the corrector which contains provisions for considering certain factors such as sound lag, wind, parallax and refraction corrections forms no part of the present invention and its operation in connection with a comparator at a remote control station is sufficiently understood by those skilled in the art to appreciate the advantages accruing by virtue of its mounting on a stationary element of the mount.

The horns are movable in azimuth with the top carriage 9 and the standards by means of gearing 42 (see Fig. 7) actuated from a shaft 43 on the left hand standard and meshing with a gear wheel 44 secured to the fixed base 8. The azimuth data is transmitted to the corrector by means of shafting 45 mounted in the base 8 and geared to the hub of the carriage 9. The final transmission of this data is through shafting 46 parallel to the shafting 41 which transmits the elevation data.

By virtue of the foregoing structure the two operators of the corrector who formerly occupied seats on the rotatable top carriage may now perform their tasks from a fixed position without interfering with the listeners.

While the horns shown in the drawings are of the exponential type having one plane surface for baffling non-frontal sound waves as described in my copending application, Serial No. 220,531, filed September 19, 1927, it is obvious that the mounting is adapted for horns of any design, whether they be sound receiving or sound radiating.

The horns are conveniently arranged for transportation by dismounting the two large end sections as a unit and placing them over brackets 47 securable in any convenient manner to the standard. In order to hold them securely against movement when travelling the small ends of the dismounted units are connected by clamps 49 of any suitable description.

I claim:

1. A mount for sound apparatus including a base, a carriage rotatably mounted on the base, a pair of spaced standards on the carriage, a pair of horns each having its horizontal support section trunnioned in one of the standards and terminating adjacent their axes of rotation, a trunnion bearing composed of a damping material, a second pair of horns having support sections fixed to the inner extremity of each of the horizontal support sections and to each other, the sound conduction portion of the support sections terminating adjacent their axes of rotation, means on one of the standards for rotating the interconnected support sections on their horizontal axis and means on the other standard for rotating the carriage.

2. A mount for sound apparatus including a base, a carriage rotatably mounted on the base, a pair of spaced standards on the carriage, a pair of horns each having its horizontal support section trunnioned in one of the standards and terminating adjacent their axes of rotation, a second pair of horns having support sections fixed to the inner extremity of each of the horizontal support sections and to each other, the sound conduction portion of the support sections terminating adjacent their axes of rotation, means on one of the standards for rotating the interconnected support sections on their horizontal axis and means on the other standard for rotating the carriage.

3. A mount for sound apparatus including a base, a carriage rotatably mounted on the base, a pair of spaced standards on the carriage, a pair of horns each having its horizontal support section trunnioned in one of the standards, a second pair of horns having support sections fixed to the inner extremity of each of the horizontal support sections and to each other, means on one of the standards for rotating the interconnected support sections on their horizontal axis and means on the other standard for rotating the carriage.

4. A mount for sound apparatus including a base, a carriage rotatably mounted on the base, a pair of spaced standards on the carriage; a pair of horns each having its horizontal support section trunnioned in one of the standards, a second pair of horns having support sections fixed to the inner extremity of each of the horizontal support sections and to each other and means on one of the horizontal support sections whereby the interconnected support sections are rotated.

5. In a sound apparatus a rotatable carriage, a pair of spaced standards thereon, a cross arm support having an open center trunnioned in the standards, each of the four arms comprising an independent acoustic transmitter terminating within the open center, a horn on the outer extremity of each arm and a flexible tube attached to the inner end of each transmitter.

6. In a sound apparatus a rotatable carriage, a pair of spaced standards thereon, a cross arm support trunnioned in the standards, each of the four arms comprising an independent acoustic transmitter terminating centrally of the support, a horn on the outer extremity of each arm and a flexible tube attached to the inner end of each transmitter.

7. In a sound apparatus a rotatable carriage, a pair of spaced standards thereon, a cross arm support trunnioned in the standards, each of the four arms comprising an independent acoustic transmitter terminating centrally of the support and a horn on the outer extremity of each arm.

8. In a sound apparatus, a pair of spaced standards, a pair of sound conductors each trunnnioned in one of the standards, yokes connecting the inner extremities of the conductors and a pair of sound conductors supported by the yokes to the trunnioned conductors.

9. A trunnioned bearing for a sound conductor embodying a support, a sleeve mounted in the support and formed internally with longitudinally extending fins, a sound conductor insertable within the sleeve and formed externally with longitudinally extending fins; the fins on the sleeve and conductor being alternately arranged; a bushing of a damping material disposed sectionally between the fins and means for rotating the sleeve.

10. A bearing for a sound conductor embodying a support, a sleeve mounted in the support, a sound conductor within the sleeve, a bushing of a damping material between the sleeve and conductor, means on the sleeve and conductor for positively engaging the bushing and means for rotating the sleeve.

11. A bearing for a sound conductor embodying a support, a sleeve rotatably mounted in the support, a sound conductor within the sleeve and a driving connection between the sleeve and conductor having the capacity to dampen sound.

12. A sound apparatus embodying a base, a carriage thereon, spaced standards on the carriage, a cross arm support trunnioned in the standards, means carried by one standard for rotating the carriage, means carried by the other standard for rotating the cross arm support, a corrector carried by the base, shafting connecting the hub of the carriage to the corrector and shafting passing through the hub of the carriage and connecting the rotating means of the cross arm support to the corrector.

13. A sound apparatus embodying a base, a carriage thereon, spaced standards on the carriage, a cross arm support trunnioned in the standards, means carried by one standard for rotating the carriage, means carried by the other standard for rotating the cross arm support and a corrector carried by the base and having intoduced therein the movements of the rotating means.

14. In a mount, a rotatable carriage, spaced standards secured to the carriage, the standards being triangular in cross section and arranged on the carriage with an apical edge directed outwardly with respect to the carriage and a seat positioned outwardly with respect to the apical edge of each standard.

HIRAM B. ELY.